United States Patent
Ali et al.

(10) Patent No.: US 9,589,328 B2
(45) Date of Patent: Mar. 7, 2017

(54) GLOBALLY DOMINANT POINT SPREAD FUNCTION ESTIMATION

(71) Applicant: NIKON CORPORATION, Tokyo (JP)

(72) Inventors: Gazi Ali, Mountain View, CA (US); Li Hong, San Diego, CA (US); Radka Tezaur, Belmont, CA (US); Mark Takita, Belmont, CA (US)

(73) Assignee: Nikon Corporation (JP)

( * ) Notice: Subject to any disclaimer, the term of this patent is extended or adjusted under 35 U.S.C. 154(b) by 0 days.

(21) Appl. No.: 14/437,966

(22) PCT Filed: Mar. 7, 2013

(86) PCT No.: PCT/US2013/029655
§ 371 (c)(1),
(2) Date: Apr. 23, 2015

(87) PCT Pub. No.: WO2014/074138
PCT Pub. Date: May 15, 2014

(65) Prior Publication Data
US 2015/0254814 A1    Sep. 10, 2015

Related U.S. Application Data

(60) Provisional application No. 61/724,656, filed on Nov. 9, 2012.

(51) Int. Cl.
*G06K 9/40* (2006.01)
*G06T 5/00* (2006.01)
(Continued)

(52) U.S. Cl.
CPC ............... *G06T 5/003* (2013.01); *G06K 9/40* (2013.01); *G06K 9/527* (2013.01); *G06T 5/002* (2013.01);
(Continued)

(58) Field of Classification Search
CPC .. G06K 2009/4666; G06K 9/40; G06K 9/527; G06T 5/002; G06T 5/003
See application file for complete search history.

(56) References Cited

U.S. PATENT DOCUMENTS

| 6,347,153 B1 | 2/2002 | Triplett et al. |
|---|---|---|
| 6,928,182 B1 | 8/2005 | Chui |

(Continued)

FOREIGN PATENT DOCUMENTS

| JP | 2009049777 A1 | 5/2009 |
|---|---|---|
| WO | 2012034467 A1 | 3/2012 |

(Continued)

OTHER PUBLICATIONS

The International Preliminary Report on Patentability, PCT/US13/29609, Nikon Corporation, May 12, 2015.

(Continued)

*Primary Examiner* — Phuoc Tran
(74) *Attorney, Agent, or Firm* — Roeder & Broder LLP; Steven G. Roeder

(57) ABSTRACT

A group point spread function (238) for a blurry image (18) can be determined by dividing the blurry image (18) into a plurality of image regions (232), estimating a region point spread function (234) for at least two of the image regions (232); and utilizing at least two of the region point spread functions (234) to determine the group point spread function (238). The group point spread function (238) can be determined by the decomposition of the estimated region point spread functions (234) into some basis function, and subsequently determining a representative coefficient from the basis functions of the region point spread functions (234) to generate the group point spread function (238).

20 Claims, 6 Drawing Sheets

(51) Int. Cl.
  *G06K 9/52* (2006.01)
  *G06T 7/00* (2006.01)
  *G06T 11/00* (2006.01)
  *G06K 9/46* (2006.01)

(52) U.S. Cl.
  CPC ............ *G06T 5/006* (2013.01); *G06T 7/0081* (2013.01); *G06T 11/003* (2013.01); *G06K 2009/4666* (2013.01); *G06T 2207/10004* (2013.01); *G06T 2207/20012* (2013.01); *G06T 2207/20021* (2013.01); *G06T 2207/20104* (2013.01); *G06T 2207/20144* (2013.01); *G06T 2207/20182* (2013.01); *G06T 2207/20201* (2013.01); *G06T 2210/36* (2013.01)

(56) References Cited

U.S. PATENT DOCUMENTS

| | | | |
|---|---|---|---|
| 7,920,729 | B2 | 4/2011 | Avinash et al. |
| 8,737,761 | B2 | 5/2014 | Zhang et al. |
| 8,805,112 | B2 | 8/2014 | Hong |
| 8,824,821 | B2* | 9/2014 | Ali .......................... G06T 5/003 382/254 |
| 2001/0016054 | A1 | 8/2001 | Banker et al. |
| 2004/0218914 | A1 | 11/2004 | Sato |
| 2005/0083517 | A1 | 4/2005 | Asad et al. |
| 2008/0317357 | A1* | 12/2008 | Steinberg ........... G06K 9/00261 382/209 |
| 2009/0067742 | A1 | 3/2009 | Lim et al. |
| 2009/0196524 | A1 | 8/2009 | Godin |
| 2009/0245688 | A1 | 10/2009 | Robinson et al. |
| 2010/0080487 | A1 | 4/2010 | Yitzhaky et al. |
| 2010/0188528 | A1 | 7/2010 | Iwata et al. |
| 2010/0272356 | A1 | 10/2010 | Hong |
| 2010/0310165 | A1 | 12/2010 | Chen et al. |
| 2011/0019909 | A1 | 1/2011 | Farid et al. |
| 2011/0033132 | A1* | 2/2011 | Ishii ....................... G06T 5/003 382/275 |
| 2011/0057383 | A1 | 3/2011 | Harashina |
| 2012/0105655 | A1* | 5/2012 | Ishii ....................... G06T 5/003 348/208.4 |
| 2012/0159404 | A1 | 6/2012 | Vasireddy et al. |
| 2012/0162448 | A1 | 6/2012 | Au et al. |
| 2013/0121609 | A1 | 5/2013 | Zhang et al. |
| 2013/0169824 | A1 | 7/2013 | Hong et al. |
| 2013/0242129 | A1 | 9/2013 | Harmeling et al. |
| 2014/0002673 | A1 | 1/2014 | Wu et al. |
| 2014/0078320 | A1 | 3/2014 | Hong |
| 2014/0140626 | A1 | 5/2014 | Cho et al. |
| 2014/0140633 | A1 | 5/2014 | Wang et al. |
| 2015/0070511 | A1 | 3/2015 | Williams |

FOREIGN PATENT DOCUMENTS

| | | |
|---|---|---|
| WO | 2012060835 A1 | 5/2012 |
| WO | 2013025220 A1 | 2/2013 |
| WO | 2014074137 A1 | 5/2014 |
| WO | 2014074138 A1 | 5/2014 |

OTHER PUBLICATIONS

The International Preliminary Report on Patentability, PCT/US13/29655, Nikon Corporation, May 12, 2015 (related application).
The International Search Report and Written Opinion, PCT/US10/55325, Nikon Corporation, Dec. 30, 2010.
The International Preliminary Report on Patentability, PCT/US10/55325, Nikon Corporation, May 7, 2013.
The International Search Report and Written Opinion, PCT/US11/48218, Nikon Corporation, Apr. 23, 2012.
The International Preliminary Report on Patentability, PCT/US11/48218, Nikon Corporation, Feb. 18, 2014.
The International Search Report and Written Opinion, PCT/US13/29609, Nikon Corporation, May 10, 2013.
The International Search Report and Written Opinion, PCT/US13/29655, Nikon Corporation, May 13, 2013. (related application).
Hirsch, et al. "Fast Removal of Non-Uniform Camera Shake", IEEE International Conference on Computer Vision, 2011.
Whyte, et al. "Non-uniform Deblurring for Shaken Images", CVPR, 2010.
Kumar, et al. "Real-Time Affine Global Motion Estimation Using Phase Correlation and Its Application for Digital Image Stabilization", IEEE Trans. on Image Processing, Dec. 2011.
Aizenberg, et al. "Blur Identification by Multilayer Neural Networks Based on Multivalued Neurons," IEEE Transactions on Neural Networks, vol. 19, No. 5, pp. 883-898, May 2008.
Liu, et al. "Image Partial Blur Detection and Classification," IEEE Conference on Computer Vision and Pattern Recognition, IEEE, 2008.
Flusser, et al. "Image Features Invariant With Respect to Blur," Pattern Recognition, vol. 28, No. 11, pp. 1723-1732, 1995.
U.S. Appl. No. 14/437,953, filed Apr. 23, 2015, Nikon Corporation, with its entire prosecution and case history.

* cited by examiner

GLOBALLY DOMINANT POINT SPREAD FUNCTION ESTIMATION

RELATED APPLICATION

This application claims priority on Provisional Application Ser. No. 61/724,656 filed on Nov. 9, 2012, entitled "GLOBALLY DOMINANT POINT SPREAD FUNCTION ESTIMATION". As far as is permitted, the contents of U.S. Provisional Application Ser. No. 61/724,656 are incorporated herein by reference.

BACKGROUND

Cameras are commonly used to capture an image of a scene that includes one or more objects. Unfortunately, some of the images are blurred. For example, movement of the camera and/or movement of the objects in the scene during the exposure time of the camera can cause the image to be blurred.

A blurred captured image can be modeled as the convolution of a latent sharp image with some point spread function ("PSF") plus noise, $$B=K*L+N. \qquad \text{Equation (1)}$$

In Equation 1 and elsewhere in this document, B denotes a blurry image, L a latent sharp image, K a PSF kernel, and N represents noise (including quantization errors, compression artifacts, etc.). The inverse problem of recovering both the latent sharp image L and the PSF kernel K when only the blurry image B is known, is called a blind deconvolution problem.

Many blurry images include areas that further complicate the problem of determining the PSF kernel K and the latent sharp image L. For example, certain areas of a blurry image B will have a different blur PSF kernel. Thus, it is often very difficult to accurately determine the PSF kernel K and the latent sharp image L of a blurry image.

SUMMARY

The present invention is directed to a method for determining a globally dominant point spread function for at least a portion of a blurry image. In one embodiment, the method includes the steps of: (i) dividing the blurry image into a plurality of image regions; (ii) estimating a region PSF for at least two of the image regions; and (iii) utilizing at least two of the region PSFs to estimate the globally dominant PSF. Thus, the globally dominant PSF of the blurred image is solved by using the region PSFs and the appropriate synthesis techniques.

As provided herein, the globally dominant PSF is also referred to herein as a group PSF, because the globally dominant PSF represents the change that a group of image regions experience.

The benefits of generating a group PSF include, but are not limited to: (i) increasing robustness, because region PSF estimates can be noisy, and combining multiple region PSF estimates increases robustness; (ii) creating a model based spatially varying model of the group PSF for the entire image; (iii) increasing the accuracy of the deblurred image when the entire blurred image undergoes uniform transformation/change; and/or (iv) refinement of the region PSF estimates to reduce artifacts. In certain embodiments, after the globally dominant PSF is determined, the blurred image can be deblurred to provide the latent sharp image.

In one embodiment, the step of utilizing includes the step of decomposing and reconstructing (e.g. synthesizing) at least two region PSFs to determine the group PSF. Further, the method can include the steps of (i) classifying the region PSFs according to shape, and (ii) selecting at least two region PSFs as candidate PSFs based on shape of the region PSFs. In one embodiment, the step of selecting includes the use of a basis function to select the candidate PSFs.

Additionally, the method can include the steps of decomposing the candidate PSFs using a basis function, and determining a coefficient of this basis function for each candidate PSF. Moreover, the method can include the step of determining a weight of the basis function from the coefficient. Further, in certain embodiments, the method can include the steps of (i) refining the weight of the basis function, and (ii) using the refined weight to determine the group PSF.

In another embodiment, the present invention is directed to a device that includes a control system that preforms one or more of the steps provided herein.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
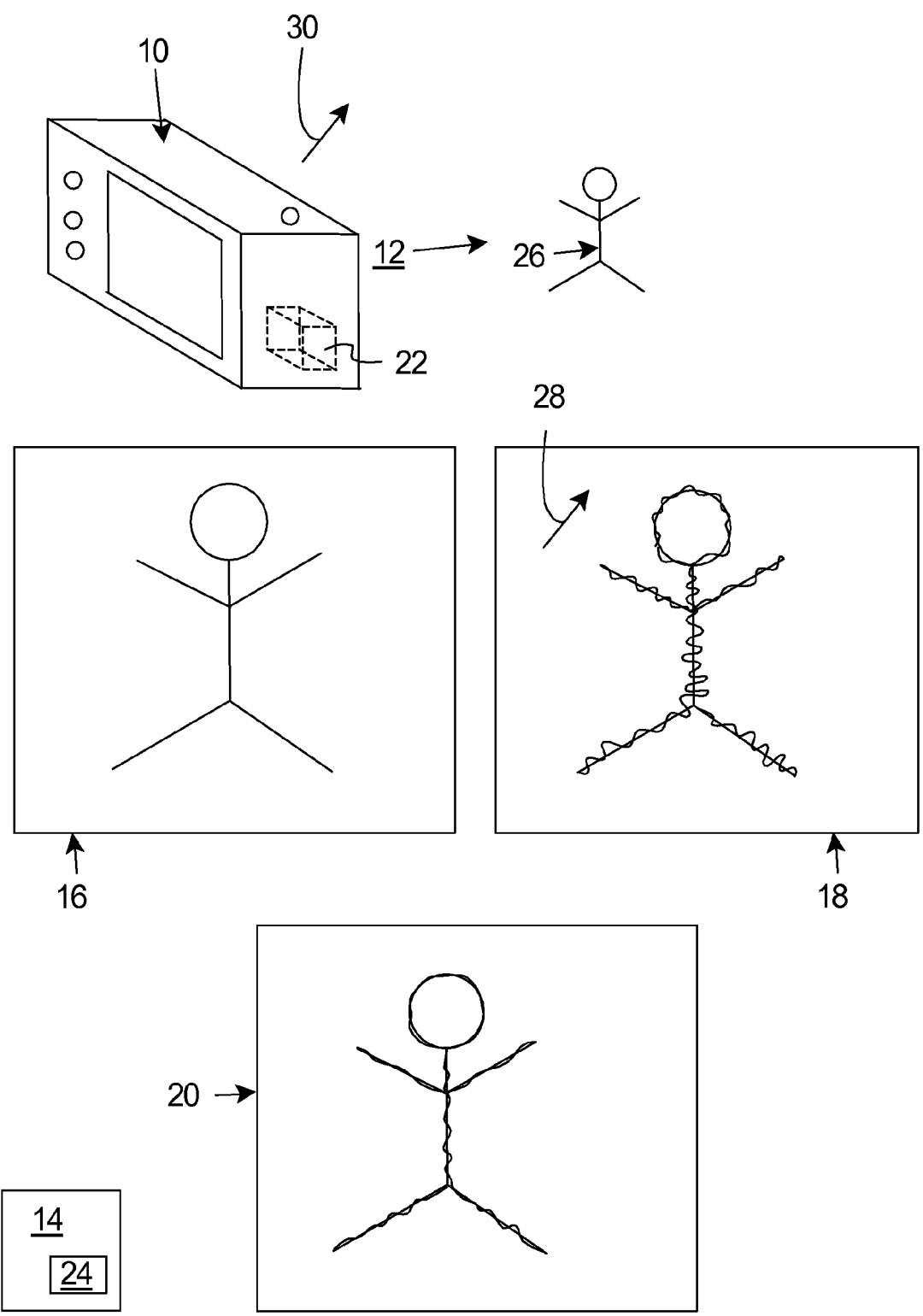
FIG. 1 is a simplified view of a scene, a computer having features of the present invention, an image apparatus having features of the present invention, a first captured image of the scene, a second captured image of the scene, and an adjusted image.

FIG. 1 is a simplified perspective view of an image apparatus 10 (e.g. a digital camera), a scene 12, and a computer 14 (illustrated as a box). FIG. 1 also illustrates a simplified, first captured image 16 (illustrated away from the image apparatus 10), and a simplified, second captured image 18 (illustrated away from the image apparatus 10) of the scene 12 that have been captured by the image apparatus

10. A simplified adjusted image 20 (illustrated away from the image apparatus 10) is also illustrated in FIG. 1. In this example, (i) the first captured image 16 is intended to illustrate a sharp image (represented by sharp lines) captured by the image apparatus 10, (ii) the second captured image 18 is intended to illustrate a blurry image (represented by wavy lines) captured by the image apparatus 10, and (iii) the adjusted image 20 is intended to illustrate a latent sharp image (deblurred version with smaller wavy lines) of the second image 18. It should be noted that the image apparatus 10 or the computer 14 can be referred to as a device.

As an overview, the present invention is directed to a unique device and method for determining a globally dominant ("group") point spread function ("PSF") for at least a portion of a blurred image (e.g. the second image 18), if the blurred image has a dominant blur direction. In one embodiment, the group PSF of the blurred image 18 can be determined by (i) dividing the image 18 into a plurality of image regions, (ii) determining which of these image regions are suitable for region PSF estimation, (iii) determining the region PSF for the suitable image regions, and (iv) synthesizing the region PSFs to generate the group PSF of the image 18. Stated in another fashion, the group PSF of the blurry image can be determined by using the local PSF estimate based basis functions and the appropriate synthesis techniques.

The group PSF can be used for various post processing algorithms e.g. image restoration, optical artifact correction, resolution enhancement, depth map generation etc. For example, the blurred image 18 can be deblurred ("restored") using the group PSF to provide the latent sharp image 20.

The benefits of generating a group PSF include, but are not limited to: (i) increasing robustness, because local estimates can be noisy, and combining multiple estimates increases robustness; (ii) creating a model based spatially varying model of the group PSF for the entire image; (iii) improving the quality of the deblurred image 20 when the entire blurred image 18 undergoes uniform transformation/change; and/or (iv) refinement of the local estimates to reduce artifacts.

In one embodiment, for in camera processing, the image apparatus 10 can include a control system 22 that uses one or more of the algorithms for determining the group PSF of at least a portion of a blurred image, and possibly post-processing of the blurred image 18. Alternatively, the blurred image 18 can be transferred to the computer 14. In this example, the computer 14 can include a control system 24 that uses one or more of the algorithms for determining the group PSF of at least a portion of the blurred image 18, and possibly post-processing of the blurred image 18.

Each control system 22, 24 can include one or more processors and circuits. Further, either of the control systems 22, 24 can include software or have access to software that utilizes one or more methods provided herein. Further, the present algorithms can be solved relatively efficiently. This will speed up the determination of the group PSF image, and possibly deblurring. This will also allow these steps to be performed with less powerful processors (e.g. processors in cameras).

The present algorithm for estimating the group PSF of at least a portion of the blurry image 18 can be used in blind convolution.

The type of scene 12 captured by the image apparatus 10 can vary. For simplicity, in FIG. 1, the scene 12 is illustrated as including one object 26, e.g. a simplified stick figure of a person. Typically, however, the scene 12 will include multiple objects.

It should be noted that movement of the image apparatus 10 (sometimes referred to as "camera shake") during the capturing of the blurred image 18 can cause motion blur that is mainly in a blur direction 28 (illustrated as an arrow). For example, in FIG. 1, the image apparatus 10 was moved along a substantially motion direction 30 (illustrated as an arrow) during the exposure time while capturing the blurred image 18. As a result thereof, the blurred image 18 has blur in the blur direction 28 that corresponds to the motion direction 30. Stated in another fashion, as a result of this motion, the entire image 18 has gone through a global change. The present invention provides a way to determine the globally dominant ("group") PSF that is the result of the global change.

It should be noted that the motion direction 30 is usually random and can be different than that illustrated in FIG. 1. This motion can be non-uniform linear motion. Alternatively, the motion can be non-linear.

Additionally, it should be noted that certain areas of the blurred image 18 can also include defocus blur and/or motion blur of one or more of the objects 26 in the scene 12. In certain embodiments, the method used to calculate the group PSF provided herein reduces the influence of any defocus blur, and/or object motion blur from the calculation of the group PSF.

Figure 2A:
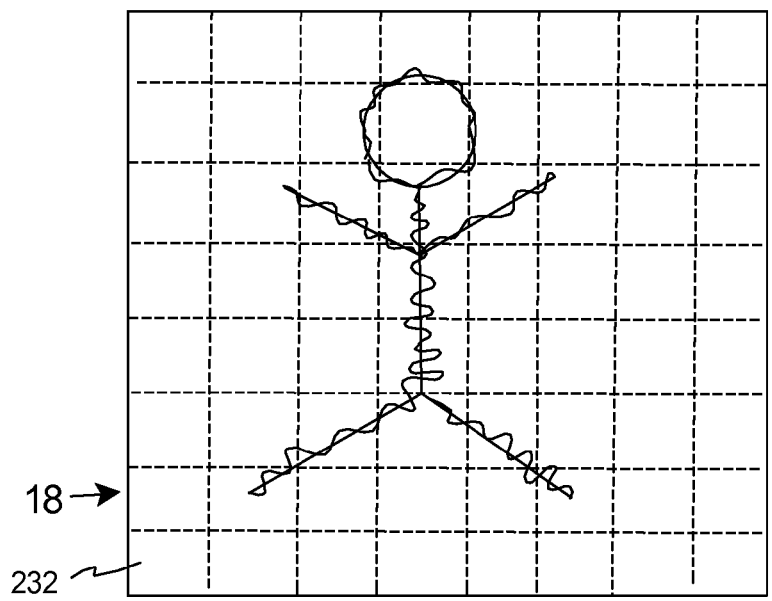
FIG. 2A is a simplified illustration of the blurred image of FIG. 1 divided into a plurality of image regions.

FIG. 2A illustrates the blurred image 18 of FIG. 1. As provided herein, the image 18 can be divided into a plurality of substantially equally sized, image regions 232. In this example, the image 218 was divided into sixty-four separate image regions 232 (outlined with dashed lines). Moreover, each of the image regions 232 is square. Alternatively, the image 218 can be partitioned into more than or fewer than sixty-four image regions 232 and/or the image regions 232 can have a shape other than square. It should be noted that the image regions 232 can also be referred to as blocks or image sections.

Figure 2B:
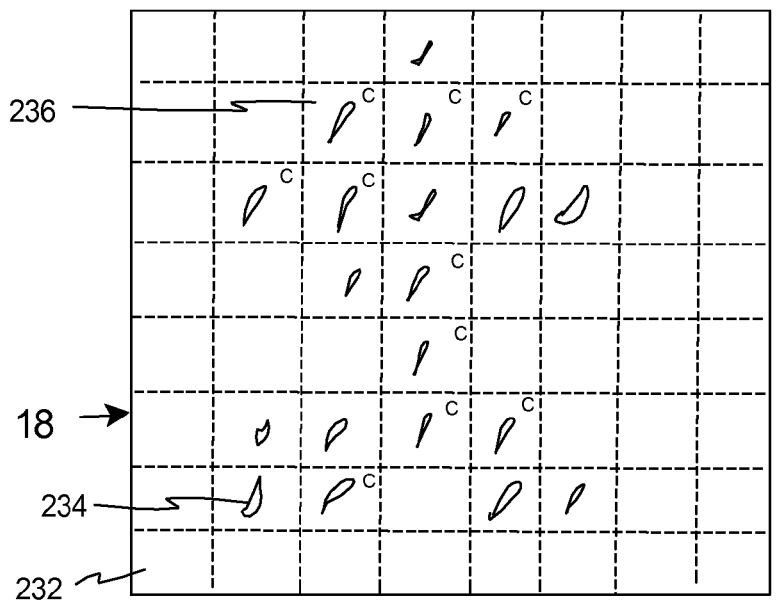
FIG. 2B is a simplified illustration of a region point spread function for each of the image regions.

FIG. 2B is a simplified illustration of the plurality of image regions 232 of the blurred image 18 (shown in FIG. 2B without the image). In FIG. 2B, a separate PSF 234 (hereinafter a "region PSF" or "local PSF") was calculated for a plurality of the image regions 234. In this simplified example, many of the image regions 232 did not have sufficient texture because the only things captured in the blurred image 18 were a stick person and background. In certain embodiment, to save computational resources, the present invention does not calculate a separate region PSF if the image region 232 lacks texture. In this simplified example, only twenty of the image regions 232 have sufficient texture. Thus, a separate region PSF 234 was calculated for twenty of the image regions 232, but no region PSF 234 was calculated for the other forty-four image regions 232 without texture. Alternatively, a separate region PSF can be individually calculated for each of the image regions 232, regardless of the texture.

As provided above, the blurred image 18 was subjected to a global change. Further, this global change is captured partially by the local, region PSF 234 estimates. Stated in another fashion, if the blurred image 18 has a dominant global blur, most of the region PSFs 234 will include the dominant global blur. One goal of the present invention is to automatically extract the group PSF that represents the global change in the blurred image by using the estimated region PSFs 234.

With the present invention, after the region PSFs 234 have been calculated, two or more of the region PSFs 234 can be synthesized to generate the group PSF of the blurred image. More specifically, in certain embodiments, the present invention selects and identifies two or more of the region PSF 234 as candidate PSFs 236 (labeled with a small 'c'). Subsequently, these candidate PSFs 236 are used to generate the group PSF. In one embodiment, the region PSFs 234 are categorized based on shape, and the candidate PSFs 236 are selected based on shape. The selection of the candidate PSFs 236 is described in more detail below.

Figure 2C:
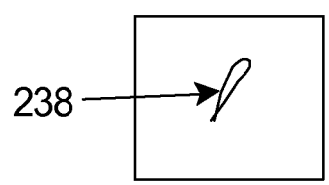
FIG. 2C is a simplified illustration of a group point spread function for the blurry image.

FIG. 2C is a simplified illustration of the resulting, group ("globally dominant") point spread function 238 for the blurred image (not shown in FIG. 2C) that was calculated by combining (e.g. synthesizing) the candidate PSFs 236 of FIG. 2B. Stated in another fashion, the present invention provides a method for determining the group PSF 238 that represents the global change of the blurred image by using the estimates of the candidate PSFs 236. In FIG. 2C, the group PSF 238 represents a global change that occurred to the entire image.

Figure 3A:
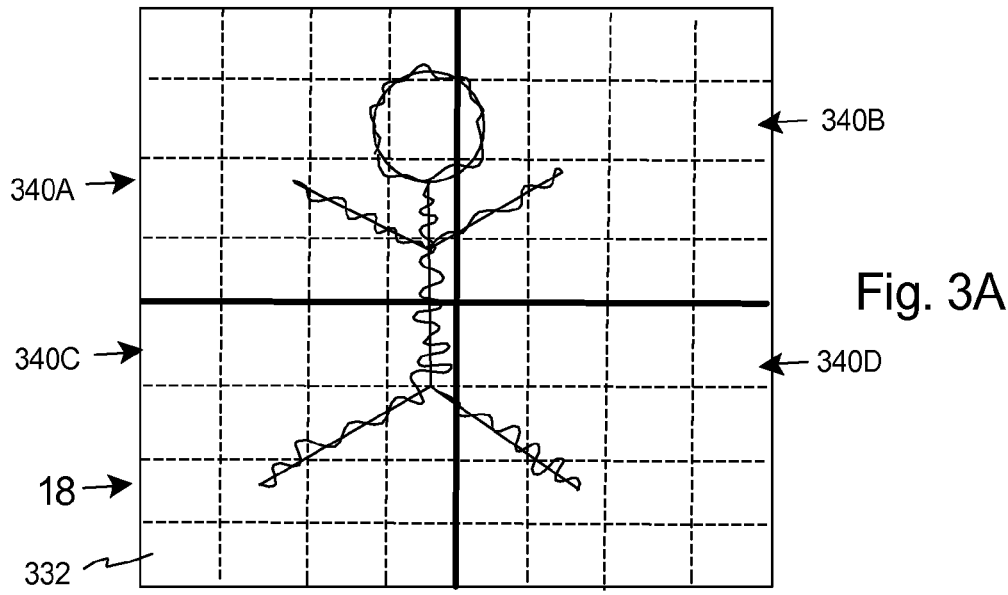
FIG. 3A is a simplified illustration of the blurred image of FIG. 1, divided into a plurality of image segments, with one of the image segments being divided into a plurality of image regions.

Alternatively, if the image is really large, the image can be divided into a plurality of image segments, with each image segment including a plurality of image regions. In this example, a separate group PSF can be calculated for one or more of the image segments. More specifically, FIG. 3A is another illustration of the blurred image 18 of FIG. 1. In this Figure, the image 18 is divided into a plurality of image segments 340A, 340B, 340C, 340D (separated with a thick lines), and each image segment 340 is subdivided into a plurality image regions 332. The number of image segments 340A, 340B, 340C, 340D, and image regions 332 can vary. In FIG. 3A, the image 18 is divided into four, equally sized, rectangular, image segments 340A, 340B, 340C, 340D, and each image segment 340A, 340B, 340C, 340D is subdivided into sixteen image regions 332. Alternatively, the shape and/or number of image segments and regions can be different than that illustrated in FIG. 3A.

Figure 3B:
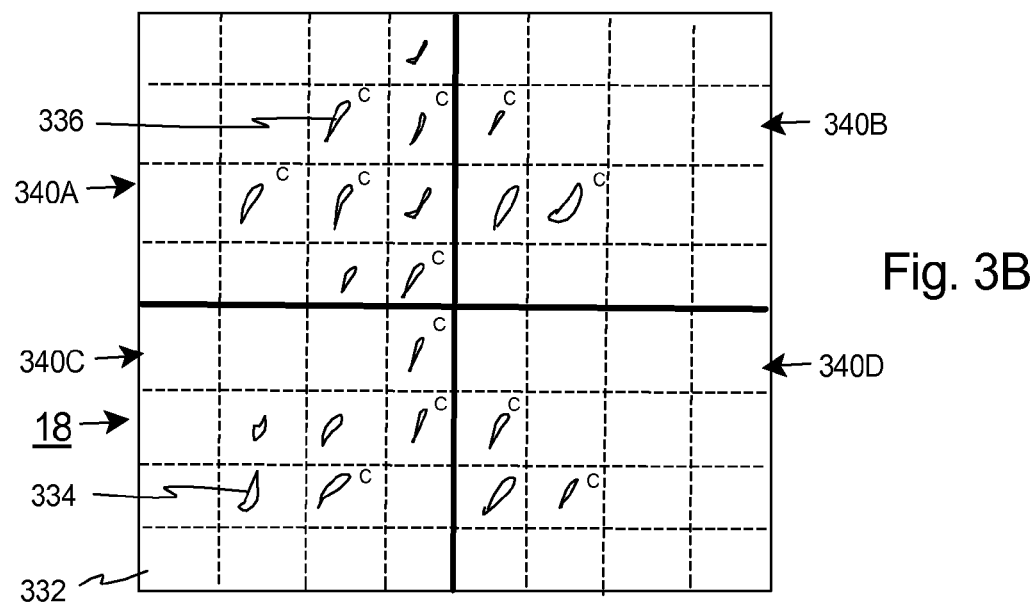
FIG. 3B is a simplified illustration of a region point spread function for each of the image regions of FIG. 3A.

FIG. 3B is a simplified illustration of the plurality of image regions 332 of the blurred image 18 (shown in FIG. 3B without the image). In FIG. 3B, a separate PSF 334 (hereinafter a "region PSF") was calculated for a plurality of the image regions 334. In this simplified example, many of the image regions 332 did not have sufficient texture. Thus, in this example, a separate region PSF 334 was calculated for twenty of the image regions 332, but no region PSF 334 was calculated for the other forty-four image regions 332 without texture.

With the present invention, for each image segment 340A, 340B, 340C, 340D, two or more of the region PSFs 334 within that image segment 340A, 340B, 340C, 340D can be synthesized to generate the group PSF for that image segment 340A, 340B, 340C, 340D. In this embodiment, for each image segment 340A, 340B, 340C, 340D, the present invention selects and identifies two or more of the region PSF 334 within the respective image segment 340A, 340B, 340C, 340D as candidate PSFs 336 (labeled with a small 'c'). Subsequently, the candidate PSFs 336 within each image segment 340A, 340B, 340C, 340D are used to generate the respective group PSF.

Figure 3C:
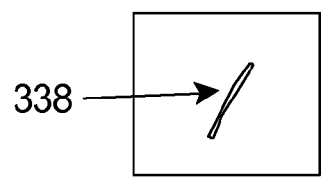
FIG. 3C is a simplified illustration of the group point spread function for one of the image segments of FIG. 3A.

FIG. 3C is a simplified illustration of the resulting, group ("globally dominant") point spread function 338 for the first image segment 340A (the upper left image segment) that was calculated by combining (e.g. synthesizing) the five candidate PSFs 336 that are within the first image segment 340A. In this example, the group PSF 338 represents the global change that occurred in the image regions 332 of the first image segment 340A of the image 18.

It should be noted that a separate group PSF (not shown) can be calculated for one or more of the other image segments 340B, 340C, 340D in a similar fashion.

As provided herein, the method utilized to synthesize the region PSFs 234, 334 to generate the group PSF 238, 338 can vary pursuant to the teaching provided herein. In one embodiment, (i) the group PSF can be represented herein with the symbol $\rho_r \bullet$, and (ii) the group PSF is the dominant PSF for at least a portion of the image. Further, all of the region PSFs that are synthesized to generate the group PSF can be modeled as a transformed version of $\rho_r$. As provided herein, the point spread function for an arbitrary image region $\rho_i \bullet$ can be expressed as $\rho_i = \Gamma_i(\rho_r)$, where the symbol $\Gamma$ is a transformation matrix. As non-exclusive examples, the transformation matrix can be modeled as projective transform related to three dimensional camera shake or it can be modeled as affine transform related to Global Motion calculation.

There are two additional issues that must be considered. First, noise ($\eta$) in an image region can influence resulting region PSF. Thus, the region PSF for the arbitrary image region can be updated to include noise as follows: $\rho_i \bullet = \Gamma_i(\rho_r) + \eta_i$.

Another issue that must be considered is outliers ($\phi_j$) (PSF estimates from other blur classes) in the image region. More specifically, defocus blur and/or movement of an object during the capturing of image can cause blur in one or more image regions that is not caused by the global movement of the camera and that is not experienced by the entire image.

As provided herein, the estimated PSF set can be expressed as follows:

$$P = \{\rho_i|_{i=1}^n\} \cup \{\phi_j|_{j=1}^m\}, \qquad \text{(Equation 2)}$$

where (i) P is the estimated PSF set, (ii) $\phi_j \bullet$ are outliers that can't be modeled as noise, (iii) n is a number of PSF belonging to motion blur class or a number of PSF belonging to desired PSF group, and (iv) m is number of outlier PSF. In one embodiment, the goal is to get the group PSF ("$\rho_r \bullet$") from P. In one embodiment, after the PSF set is obtained, a PSF classification process is applied to identify the candidate PSF which are motion blur PSFs. The candidate PSFs are then used to compute a representative group PSF.

Figure 4:
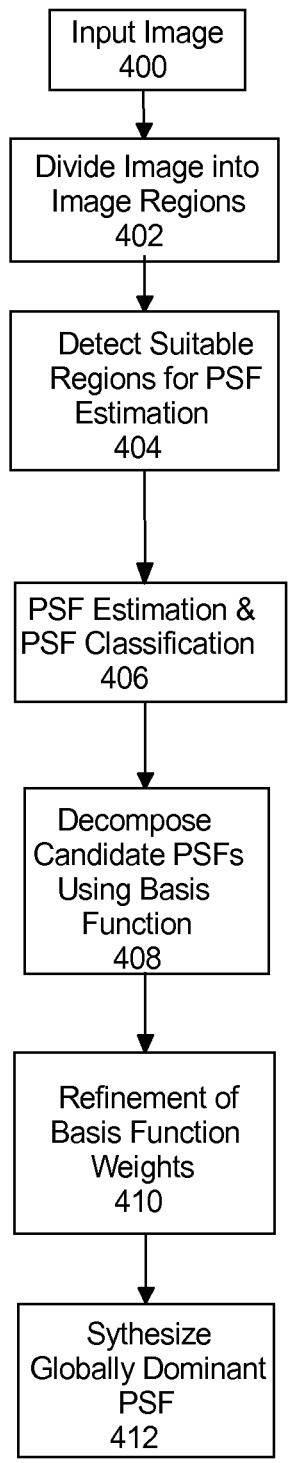
FIG. 4 is a flow chart that illustrates one embodiment of a method for determining the globally dominant point spread function of FIG. 2B.

FIG. 4 is a simplified flow chart that outlines one, non-exclusive procedure for determining the group PSF 238, 338 (illustrated in FIG. 2C, 3C) using the control systems provided herein. In this example, at step 400, the input image to be evaluated is provided to the control system. In the example in which the control system 22 (illustrated in FIG. 1) of the image apparatus 10 (illustrated in FIG. 1) is performing the processing, the blurred images can be captured by the image apparatus 10. Alternatively, if the control system 24 (illustrated in FIG. 1) of the computer 14 (illustrated in FIG. 1) is performing the processing, the blurred images can be captured by the image apparatus 10 and transferred to the computer 14.

Next, at step 402, the image can be divided into a plurality of image regions by the control system. Suitable image regions are discussed in reference to FIGS. 2A and 3A.

Subsequently, at step 404, the image regions are evaluated by the control system to determine which of the image regions are suitable for region PSF estimation. This step is optional and can be performed as a pre-processing step to reduce unnecessary calculations of erroneous PSF estimates. Currently, there are several different measures to detect these regions. For example, suitable image regions have sufficient contrast, and/or edges, while unsuitable image regions have very little contrast, are too structured or are saturated. One example of a method for identifying suitable and unsuitable image regions is described in relation to FIG. 5 below.

Once the suitable regions have been identified, at step 406, the region PSF for each of these suitable image regions can be estimated with the control system. Stated in another fashion, at step 406, region PSF estimation is performed using known methods for the suitable regions.

As a non-exclusive example, for each suitable image region, the algorithms used for solving the blind deconvolution problem estimate both the PSF kernel K and the latent sharp image L. These algorithms are iterative and usually they alternate, improving the current estimates of the PSF and the latent sharp image. The steps of improving the current estimates of the PSF and the current estimate of the latent sharp image are typically in the form of solving an optimization problem. More specifically, for blind deconvolution, (i) a cost function is formulated and minimized to find a solution for image deconvolution, and (ii) a cost function is formulated and minimized to find a solution for the PSF blur kernel estimate.

One common approach to image deconvolution is re-formulating it as a regularized least squares problem, and the minimization of a latent sharp image cost function that has the following form:

$$c(L) = \|K*L-B\|_2^2 + p(\|D_x*L\|_2^2 + \|D_y*L\|_2^2). \quad \text{Equation (3)}$$

In Equation 3, the term $\|K*L-B\|_2^2$ is considered a fidelity term that makes the latent sharp image L conform to the model in Equation (1) with the noise as small as possible. Further, in Equation 3, the term $(\|D_x*L\|_2^2 + \|L_2\|^2)$ is considered a regularization term that helps to deal with the ill-conditioned nature of the problem and noise magnification. The regularization term can be also interpreted as a form of infusing prior information about the image. As $(\|D_x*L\|_2^2 + \|L_2\|^2)$ is made small, the gradient of latent sharp image L is forced to be sparse, with most elements being zero or close to zero, which is one of the common properties exhibited by natural images.

Additionally, in Equation 3 and elsewhere in this document, (i) c(L) is the cost function for the latent sharp image, (ii) L is the latent sharp image, (iii) K is a PSF kernel, (iv) B is a blurry image, (v) Dx and Dy are the first order partial derivative operators and parameters, and (vi) p is a weight parameter that helps to set proper balance between the fidelity and the regularization term so as to achieve the best compromise between the sharpness of recovered latent sharp image and the noise and other artifacts present in the reconstructed image.

Further, a common cost function for estimating the PSF kernel K can be re-formulated as a regularized least squares problem, and the minimization of a PSF cost function has the following form:

$$c(K) = \|K*D_x*L - D_x*B\|_2^2 + \|K*D_y*L - D_y*B\|_2^2 + \theta\|K\|_2^2. \quad \text{Equation (4)}$$

In Equation 4, the term $\|K*D_x*L - D_x*B\|_2^2$ and $\|K*D_y*L - D_y*B\|_2^2$ are considered fidelity terms that makes the latent sharp image L conform to the model in Equation (1) with the noise as small as possible. Further, in Equation 4, the term $\|K\|_2^2$ is considered a regularization term that helps to deal with ill-conditioned nature of the problem and noise magnification.

Moreover, in Equation 4, (i) c(K) is the cost function for the PSF kernel, and (ii) θ is a weight parameter that helps to set a proper balance between the fidelity and the regularization term so as to achieve the best compromise between the sharpness of recovered latent sharp image and the noise and other artifacts present in the reconstructed image. The regularization term can be also interpreted as a form of infusing prior information about the image to deal with ill-conditioned nature of the problem and noise magnification. Including $\|K\|_2^2$ in the cost function of c(K) that is minimized to find a new estimate of PSF kernel K forces most elements of K to be very small. It thus gives preference to sparse PSF kernels that have most elements equal to 0, which is desirable in the cases of blur such as motion blur when the non-zero elements in PSF form a curve corresponding to motion trajectory.

The minimization of cost functions c(L) and c(K) that have the form Equations (3) and (4), respectively, is a pair of regularized least squares problems. When K and L are rectangular arrays of the same size and periodic convolution is considered, both these regularized least squares problem have a closed form solution. The formulas for the solutions are $$L = F^{-1}\left(\frac{\overline{F(K)}F(B)}{|F(K)|^2 + p(|F(D_x)|^2 + |F(D_y)|^2)}\right) \quad \text{Equation (5)}$$

and $$K = F^{-1}\left(\frac{\overline{F(L)}(|F(D_x)|^2 + |F(D_y)|^2)F(B)}{|F(L)|^2 + \theta}\right), \quad \text{Equation (6)}$$

respectively. In Equations 5 and 6, the multiplication and division of arrays are both element-wise. Further, F denotes the operator of a two dimensional Fourier transform of a rectangular array using periodic extension, which can be implemented very efficiently via fast Fourier transform. As a result thereof, these closed form formulas allow for computing of the deconvolved image and the PSF relatively quickly.

After the region PSF for each suitable image region has been estimated, at step 406, these region PSFs can be classified. As a non-exclusive example, each region PSFs can be categorized in different classes according to the geometric/structural properties of the region PSF. This PSF classification is described in more detail with reference to FIG. 6 below. After the PSF classification of the region PSFs is complete, certain candidate PSFs can be selected from a certain class based on the application. In certain embodiments, the candidate PSFs can selected using a basis function to eliminate outliers.

At step 408, the candidate PSFs are decomposed using a basis function. The choice of the basis function is flexible and can be tied to the application in mind. As non-exclusive examples, a discrete cosine transforms (DCT) bases and/or a wavelet bases can be used as the basis function. This is further described in relation to the discussion of FIG. 6. Alternatively, other types of basis functions can be utilized.

Next, at step 410, the basis function weights are refined. Stated in another fashion, at step 410, the coefficients for each basis function can be refined using the local estimates. In this step, the goal is to capture the global representation of the PSF, so that coefficients that are less relevant get less importance. This step can be iterative. Also each iteration can have specific strategy for convergence.

Finally, after the convergence criteria of step 410 is met, at step 412, the group ("globally dominant") PSF is synthesized. In certain embodiments, at step 412, the inverse transform of step 408 is performed to synthesize the group PSF.

With the present invention, the group PSF is determined from the estimated region PSFs using the decomposition of region PSFs into some basis, and subsequently getting the coefficient for this basis from the region PSF estimates.

Figure 5:
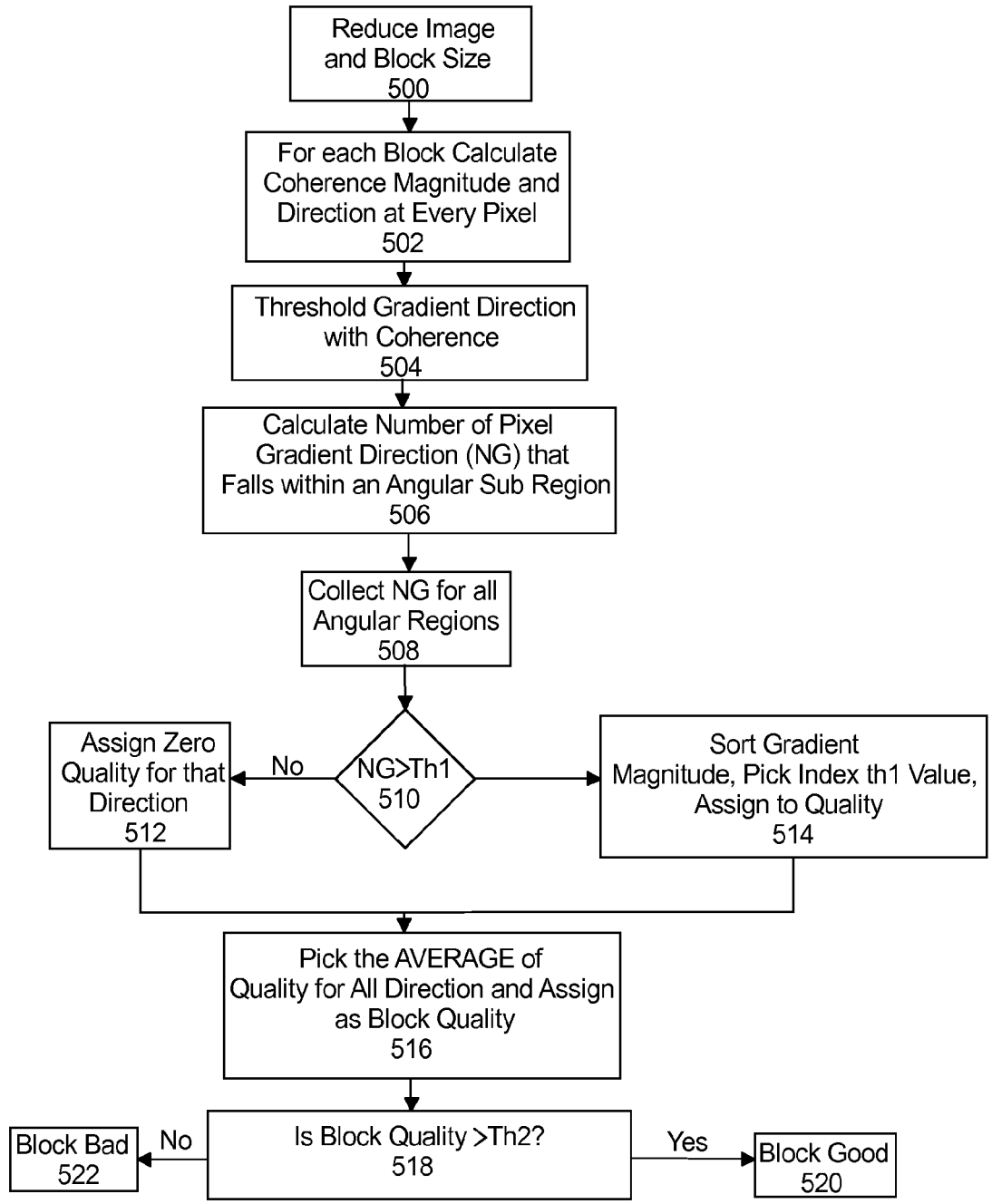
FIG. 5 is a flow chart that illustrates one embodiment of a method for detecting good and bad image regions.

FIG. 5 is a flow chart that illustrates the steps that can be performed by the control system to identify which of the image regions ("blocks") are suitable or unsuitable for region PSF estimation. Stated in another fashion, FIG. 5 is a flow chart used to identify unsuitable image regions (bad block detection). The procedure outline in FIG. 5 can be used for step 404 in FIG. 4.

In one non-exclusive embodiment, bad block detection of FIG. 5 is a pre-processing step that is used to remove image regions from PSF estimation. In certain embodiments, the bad image regions can correspond to low-texture or 'flat' areas in the image. As provided herein, regions with low texture do not provide very accurate point spread function estimates. Thus, these regions are not used for the determination of the globally dominant PSF.

One example suitable bad block algorithm is illustrated in FIG. 5. The thresholds in FIG. 5 can be selected based on need.

In FIG. 5, at block 500, the image size and each image region is reduced to save computational time. This is an optional step that can be performed using downsampling. Next, at step 502, for each block (can be downsampled), the coherence magnitude and direction are calculated at every pixel. Next, at step 504, the valid gradient direction with coherence is determined. At step 506, the number of pixel gradient direction (NG) that falls within an angular subregion is calculated. At step 508, the pixel gradient direction (NG) for all angular regions is collected.

Next, at step 510, the number of pixels with gradient direction in an angular sub-region is compared to a first threshold (th1). If the number of pixels with gradient direction in an angular sub region is less than the first threshold, at step 512, zero quality is assigned for that direction. Alternatively, if number of pixels with gradient direction in an angular sub region is greater than the first threshold, at step 514, the gradient magnitudes are sorted, and the index threshold value is assigned to quality. Subsequently, at step 516, the average of the quality for all directions is picked and assigned as a block quality. Next, at block 518, the block quality is compared to a second threshold (TH2). If the block quality is greater than the second threshold, at block 520, the block is good. If the block is determined to be good, the block is considered to be suitable, and the region PSF is determined for that block. Alternatively, if the block quality is less than the second threshold, at block 522, the block is bad and not used for evaluation.

Another example of bad/good block detection is to use a sharpness measure to check the validity of the block for PSF estimation. Examples of suitable sharpness classifiers can be found in WO 2011/139288 published on Nov. 10, 2011, and International Application No. PCT/US2011/048218, filed on Aug. 18, 2011. As far permitted, the contents of in WO 2011/139288 published on Nov. 10, 2011, and International Application No. PCT/US2011/048218 are incorporated herein by reference.

Figure 6:
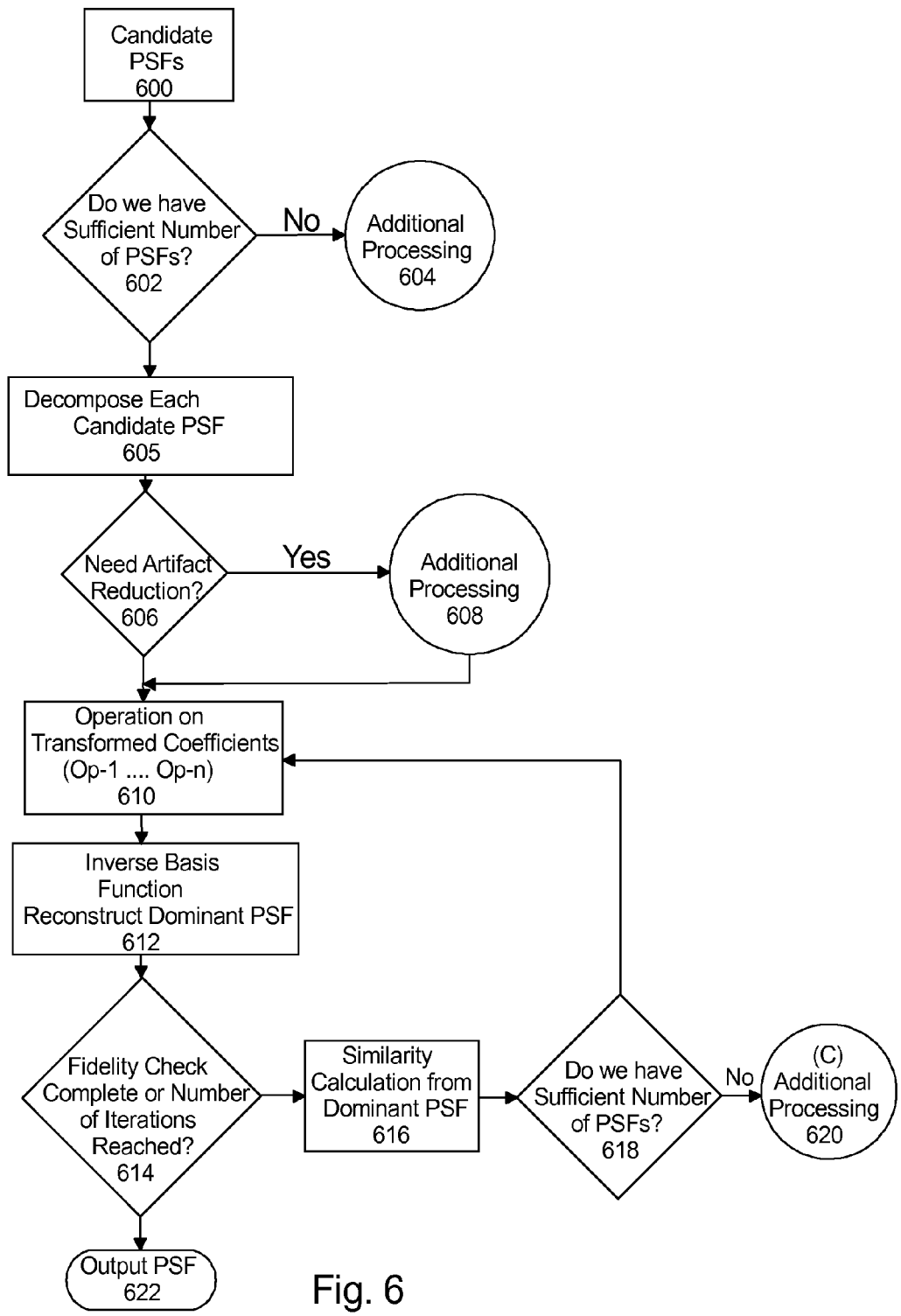
FIG. 6 is a flow chart that illustrates one embodiment of a method for determining candidates for PSF decomposition, refinement, and synthesis of the globally dominant PSF estimation.

FIG. 6 is a flow chart that illustrates the steps that can be used by the control system to calculate the candidate PSF decomposition (step 408 in FIG. 4), refinement of the basis function weights (step 410 in FIG. 4), and synthesis for the group PSF estimation (step 412 in FIG. 4).

More specifically, at step 600, after the region PSFs are calculated, the candidate PSFs are selected from the region PSFs. In certain embodiments, the region PSFs can be categorized in different classes according to the geometric/structural properties of the region PSF. For example, the PSF of a defocus blurred image region is generally circular, while the PSF of a motion blurred image region is sparse. Thus, the region PSFs can be classified according to shape (e.g. circular shape or sparse shape). After the PSF classification of the region PSFs is complete, certain candidate PSFs can be selected from a certain class based on the application. For example, the region PSF that are sparse can be selected. In certain embodiments, the candidate PSFs can be selected using a basis function to eliminate outliers.

Next, at step 602, the control system evaluates if there are a sufficient number of candidate PSFs to generate the group PSF. Generally speaking, the number of candidate PSFs necessary to generate the group PSF can vary according to the total number of image regions in the image. As alternative, non-exclusive embodiments, the minimum number of candidate PSFs is at least approximately sixty, fifty, forty, thirty, or twenty percent of the overall number of image regions.

If no, at step 604, additional processing is necessary. For example, additional processing can include adjusting good candidate criteria and searching for additional good PSF candidates, or selecting clustering regions to refine PSF estimation, or reporting warning that global PSF failed due to insufficient candidates.

If yes, at step 605, each candidate PSF is decomposed (e.g. transformed) using a basis function. The choice of the basis function is flexible and can be tied to the application in mind. As non-exclusive examples, a discrete cosine transforms (DCT) bases and/or a wavelet bases can be used as the basis function. In this example, the discrete cosine transforms (DCT) bases and/or Wavelet bases (Tx) of each candidate region PSF is determined.

More specifically, for example, for each candidate PSF, the wavelet based representation can be calculated as follows:

$$PSF_n = \sum_i a_i \phi_i, \qquad \text{Equation (7)}$$

where (i) $PSF_n$ is a candidate PSF, (ii) $\phi_i$ is the i-th basis function, and (iii) $a_i$ is the coefficient of the basis function. Alternatively, other types of basis functions can be utilized for the decomposition. During this step, a separate coefficient of the basis function is determined for each of the candidate PSFs. These coefficients can collectively be referred to as a set of coefficients of the candidate PSFs.

Next, at step 606, the control system evaluates if artifact reduction is necessary. For example one or more strong edges, long straight lines, or texture bias can cause artifacts in the resulting region PSF. If yes, at step 608, additional processing is necessary. For example, the additional processing can include artifact reduction and/or refinement of the coefficient. It should be noted that steps 606 and 608 are optional.

If artifact reduction is not necessary or after additional processing, at step 610, the operation of the transformed coefficients is performed. At this step, a representative coefficient of the basis function is selected from the set of coefficients of the candidate PSFs. The goal is to select the coefficient of the basis function that is common to all of the candidate PSFs. As provided herein, the global trend will be captured with the representative coefficient of the basis function. As non-exclusive examples, the representative coefficient of the basis function can be selected (i) by averaging the set of coefficients of the candidate PSFs, (ii) by taking the median coefficient of the set of coefficients of the candidate PSFs, or (iii) a linear combination of the set of coefficients of the candidate PSFs. In block 610, Op1 . . . Op-n represents the functions or operations on transformed coefficients for the basis function.

As provided herein, the representative coefficient, $w_i$ (also referred to as the basis function weight sum) can be represented in the following Equations 8 and 9:

$$w_i = \sum_{j=1}^{n} k_j a_j \qquad \text{Equation (8)}$$

for a linear weighted sum, where $k_1$ is linear weighting; or $$w_i = f(a_j|_{j=1}^{n}) \qquad \text{(Equation 9)}$$

for a non-linear weighted sum, where $f$ is a non-linear operation. For example, median operation on the set of coefficients can be applied. In that case, the weight is obtained by applying a non-linear operation on the coefficient set. Equations 8 and 9 above are two ways to compute the weights of the basis function.

Next, at step 612, the inverse of the basis function of each candidate region PSF are synthesized to reconstruct the dominant (group) PSF. For example, the inverse of the discrete cosine transforms (DCT) bases and/or the Wavelet bases (Tx) of each candidate region PSF are synthesized to reconstruct the dominant PSF. This can be expressed as follows:

$$PSF_{recon} = \sum_{i} w_i \phi_i \approx \rho_r, \qquad \text{Equation (10)}$$

where $PSF_{recon}$ is the reconstructed PSF. As provided herein, the group PSF $p_r$ is set to be approximately equal to the reconstructed PSF.

Subsequently, at step 614, a fidelity check is performed to determine if the calculated, dominant PSF is accurate, or if the predetermined number of iterations (e.g. ten iterations) have been completed. A non-exclusive example of a suitable fidelity check includes checking to determine if there are enough support among the dominant PSF and the candidate PSFs. There should be certain amount of correlation between the dominant PSF and candidate PSFs. One example is to use average cross-correlation coefficient between dominant PSF and candidate PSFs. In addition, the shape of the dominant PSF can be checked to make sure it truly belongs to motion blur class. Further, in alternative, non-exclusive examples, the predetermined number of iterations can be approximately five, ten, or fifteen.

If yes, at step 622, the calculated dominant PSF is output as the group ("globally dominant") PSF. In not, at step 616, a similarity calculation from the dominant PSF is performed. A suitable similarity calculation includes computing the correlation between each candidate PSF and the calculated dominant PSF.

At step 618, the control system evaluates whether there is a sufficient number of candidate PSFs. For example, the number of candidate PSFs belonging to a desired class can be checked. If this number is above a predetermined threshold, then a globally dominant PSF can be determined from the candidate PSFs.

If no, additional processing is necessary at step 620. For example, the additional processing can include adjusting good candidate criteria and searching for additional good PSF candidates, or selecting clustering regions to refine PSF estimation, or reporting warning that global PSF failed due to insufficient candidates. In extreme cases, the image may not contain PSFs from desired class to estimate dominant PSF. In that case, the user may get a message describing the situation.

If yes, steps 610-614 are repeated until at step 622, the global dominant PSF is output. With this design, the representative coefficient, and the basis function weights can be refined using the local PSF estimates. The goal is to capture the global representation of the PSF, so that coefficients that are less relevant get less importance. These steps are iterative, and each iteration can have specific strategy for convergence. Finally, after the convergence criteria is met, at step 622, the group ("globally dominant") PSF is provided.

After the group PSF is determined, the group PSF can be used for subsequent processing of the image.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A method for determining a group point spread function for at least a portion of a blurry image, the method comprising the steps of:
   dividing the blurry image into a plurality of image regions;
   evaluating one of texture and contrast in each of the plurality of image regions to determine which of the plurality of image regions should be utilized for region point spread function estimation;
   estimating a region point spread function for at least two of the image regions; and
   utilizing at least two of the region point spread functions to determine the group point spread function for the plurality of the image regions.

2. The method of claim 1 wherein the step of utilizing includes the step of decomposing and reconstructing at least two of the region point spread functions to determine the group point spread function.

3. The method of claim 1 further comprising the step of classifying the region point spread functions according to the shape of the region point spread function.

4. The method of claim 3 further comprising the step of selecting at least two region point spread functions as candidate point spread functions based on a shape of the region point spread function.

5. The method of claim 4 wherein the step of selecting includes the use of a basis function to compute the candidate point spread functions.

6. The method of claim 4 further comprising the step of decomposing the candidate point spread functions using a basis function, and determining a coefficient of this basis function for each candidate point spread function.

7. The method of claim 6 further comprising the step of determining a weight of the basis function from the coefficient.

8. The method of claim 7 further comprising the steps of refining the weight of the basis function, and using the weight to determine the group point spread function.

9. A method for determining a group point spread function for at least a portion of a blurry image, the method comprising the steps of:
   dividing the blurry image into a plurality of image regions;

estimating a region point spread function for at least two of the image regions;

decomposing at least two of the region point spread functions using a basis function;

determining a coefficient of the basis function for each of the at least two region point spread functions to obtain a set of coefficients; and utilizing the set of coefficients to determine the group point spread function.

10. The method of claim 9 further comprising the step of classifying the region point spread functions according to a shape of the region point spread function, and selecting at least two region point spread functions as candidate point spread functions based on the shape of the region point spread function.

11. The method of claim 10 wherein the step of selecting includes the use of another basis function to select the candidate point spread functions.

12. The method of claim 10 wherein the step of decomposing includes decomposing the candidate point spread functions.

13. The method of claim 9 wherein the step of utilizing the set includes the step of selecting a representative coefficient from the set of coefficients.

14. The method of claim 13 wherein the step of utilizing includes the step of determining a weight of the basis function from the representative coefficient, and using the weight to estimate the group point spread function.

15. A device for determining a group point spread function for at least a portion of a blurry image, the device comprising:

a control system that includes a processor that is adapted to perform the steps of (i) dividing the blurry image into a plurality of image regions; (ii) estimating a region point spread function for at least two of the image regions; (iii) decomposing at least two of the region point spread functions using a basis function; (iv) determining a coefficient of the basis function for each of the at least two region point spread functions to obtain a set of coefficients; and (v) utilizing the set of coefficients to determine the group point spread function.

16. The device of claim 15 wherein the processor is adapted to further perform the step of classifying the region point spread functions according to a shape of the region point spread function, and selecting at least two region point spread functions as candidate point spread functions based on the shape of the region point spread function.

17. The device of claim 15 wherein the processor is adapted to select a representative coefficient from the set of coefficients.

18. The device of claim 17 wherein the processor is adapted to determine a weight of the basis function from the representative coefficient, and use the weight to estimate the group point spread function.

19. The device of claim 15 wherein the basis function includes at least one of discrete cosine transforms bases and wavelet bases.

20. The device of claim 15 wherein the group point spread function is determined for an entirety of the blurry image.

* * * * *